(12) United States Patent
Hudson

(10) Patent No.: US 7,681,524 B1
(45) Date of Patent: Mar. 23, 2010

(54) RECREATIONAL CAT HOUSE

(76) Inventor: Bobette Margaret Hudson, P.O. Box 2365, Rancho Cordova, CA (US) 95741

( * ) Notice: Subject to any disclaimer, the term of this patent is extended or adjusted under 35 U.S.C. 154(b) by 0 days.

(21) Appl. No.: 10/941,498

(22) Filed: Sep. 14, 2004

(51) Int. Cl.
*A01K 1/035* (2006.01)

(52) U.S. Cl. ............................. 119/28.5; 119/706; 5/9.1

(58) Field of Classification Search ............... 119/28.5, 119/706; 5/110, 113, 9.1, 114, 201; 135/121, 135/115; 47/20.1, 31
See application file for complete search history.

(56) References Cited

U.S. PATENT DOCUMENTS

| | | | | |
|---|---|---|---|---|
| 1,135,707 A | * | 4/1915 | Mattes | 5/113 |
| 3,601,825 A | * | 8/1971 | Moorhead et al. | 5/110 |
| 4,819,582 A | * | 4/1989 | Lichvar | 119/474 |
| 5,080,042 A | * | 1/1992 | Rubin | 119/706 |
| 5,339,471 A | * | 8/1994 | Lanzara | 5/110 |
| D370,093 S | * | 5/1996 | DeLuca | D30/160 |
| 5,577,465 A | * | 11/1996 | Cook | 119/498 |
| 5,577,466 A | * | 11/1996 | Luxford | 119/706 |
| 5,806,464 A | * | 9/1998 | Willinger et al. | 119/706 |
| 5,992,348 A | * | 11/1999 | Harding | 119/28.5 |
| 2005/0051106 A1 | * | 3/2005 | Tulgren et al. | 119/28.5 |

* cited by examiner

*Primary Examiner*—Rob Swiatek
(74) *Attorney, Agent, or Firm*—Mark C. Jacobs

(57) ABSTRACT

An apparatus for the recreational use of pets, which is durable, lightweight, made with a versatile construction that has replaceable components, and is aesthetically appealing. Several aspects are comprised such as a structural frame support, sleeping platforms, a basket area for storing items, a litter box storage area, and an open floor storage area. Doors may be added to enclose the floor storage area. A scratch pad may be optionally mounted onto the frame.

7 Claims, 2 Drawing Sheets

RECREATIONAL CAT HOUSE

FIELD OF THE INVENTION

The present invention relates generally to pet recreational equipment. More particularly, the invention relates to pet recreational equipment that is suitable for the comfort and entertainment needs of a cat or the like.

BACKGROUND OF THE INVENTION

Conventional cat recreational houses typically are carpet-covered houses and play areas having structural supports made of wood or heavy cardboard. As a result, sleep areas and scratch areas are very difficult if not impractical, to keep sanitary, whereby after a certain amount of use by a cat, the conventional cat recreational house must be discarded to the trash. Often they are bulky, heavy and have little aesthetic appeal. Moreover, typically they have no replaceable components, are not compatible with home décor (e.g., color trends and preferences in home furnishings), cannot be constructed and/or customized by the consumer, and have limited cost effectiveness.

In view of the foregoing, there is a need for improved techniques in the design and construction of cat recreational houses. It would be desirable if the improved approach was durable, lightweight and made with a versatile construction that has replaceable components, which might suitable for sale as a "do-it-yourself" product. It would further desirable if it was also designed to be aesthetically appealing, hygienic, and ergonomic.

BRIEF DESCRIPTION OF THE DRAWINGS

The present invention is illustrated by way of example, and not by way of limitation, in the figures of the accompanying drawings and in which like reference numerals refer to similar elements and in which.

Unless otherwise indicated illustrations in the figures are not necessarily drawn to scale.

SUMMARY OF THE INVENTION

To achieve the forgoing and other objects and in accordance with the purpose of the invention, a variety of techniques for the design and construction of pet recreational houses are described.

An apparatus for the recreation of pets is provided comprising several aspects, such as a means for providing structural frame support, means for providing sleeping platforms joined to the frame means, means for storing items in a basket on the frame means, means for containing a litter box within the frame means, and means for storing items in an open floor area of the frame means. Some embodiments further include means for enclosing at least one side of the floor storage means. The present recreational pet apparatus has embodiments that also include means for a pet to scratch upon.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments.

The present invention is directed to cat recreational house designs, embodiments of which comprise construction aspects such as customized sizing, replaceable components, kits for consumer completion, and numerous decorative finishes; and, functional aspects including cat trees, scratch posts, cat beds, play areas, and litter box holders.

Figure 1:
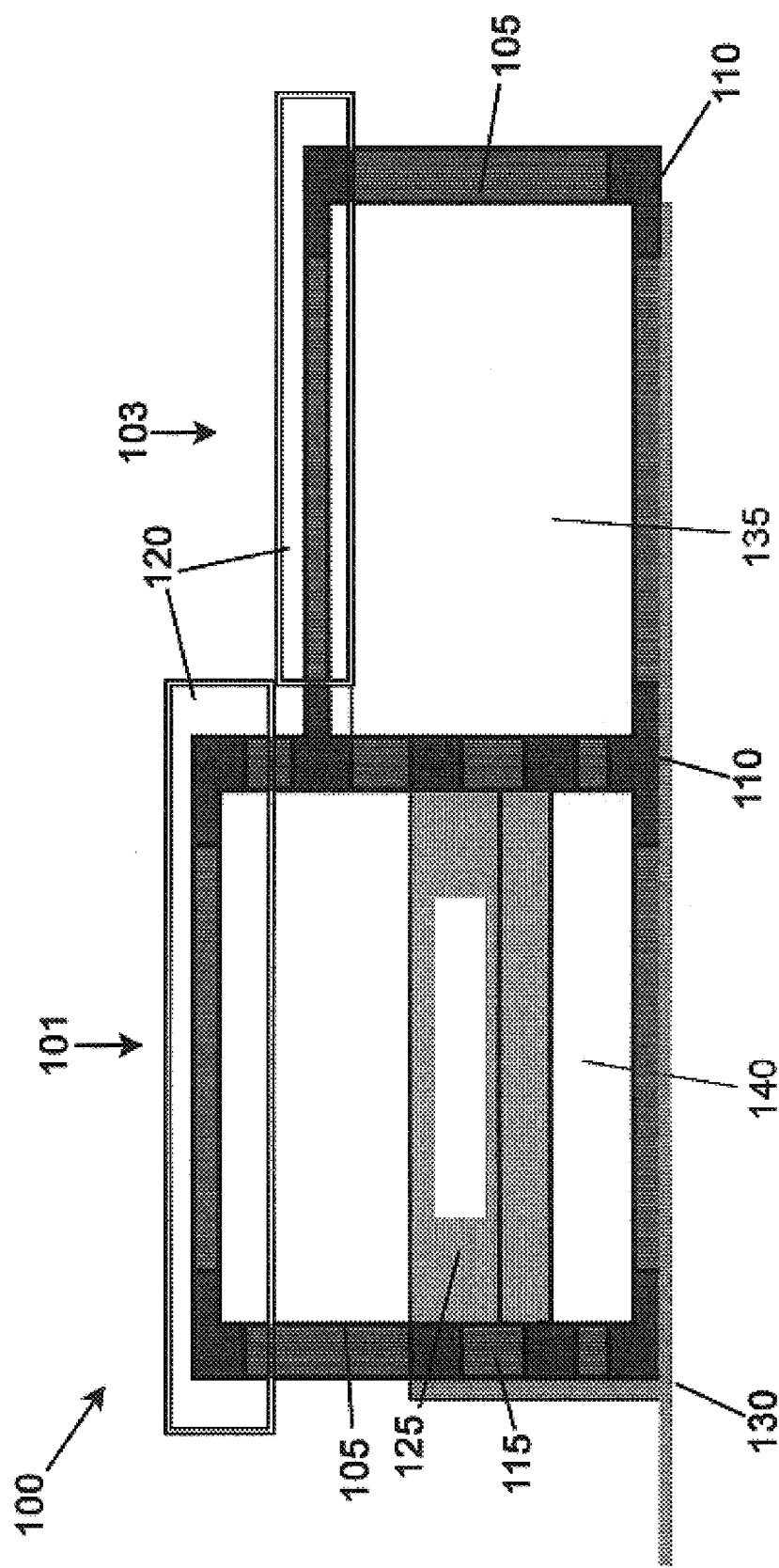
FIG. 1 illustrates a front view of an exemplary first embodiment of the present invention.

A front view of a first embodiment of the present invention is illustrated by way of example in FIG. 1. A cat recreational house 100 is shown having a frame structure comprising a left vertical column 101 and a right vertical column 103 being constructed with frame pipes 105 and pipe joints 110 (shown as shaded joints in the Figure). In a preferred embodiment, the pipes and joints making the frame are conventional PVC materials used in the plumbing arts. Those skilled in the art will readily recognize a multiplicity of alternative suitable framing materials beyond PVC pipe/joint framing. For example, some alternative suitable framing materials include, but is not limited to, heavy plastic tubular piping, and various metal based materials, albeit less cost effective in many applications. The framing material may, furthermore, be solid or hollow, new or recycled.

Cat recreational house 100 is shown equipped with a few of the multiplicity of possible components that may be included depending on the needs of the particular application. Optional components of the present invention include, but are not limited to, scratch mats, sleep platforms, pillows, plastic coated wire baskets, floor mats, solid doors, or any other known components associated with cats. The first embodiment is shown including a scratch mat 115, sleep platforms 120, a basket area 125, and a floor mat 130. The optional component parts connected to the frame may be removably attached to be replaceable or be fixedly attached. Scratch mat 115 is of known construction suitable for a cat to enjoy scratching. Suitable scratch materials include, but is not limited to, carpet, cardboard, and natural fiber based materials.

Sleep platforms 120 are located at the top of each vertical column and are constructed in any suitable way to support a cat thereupon, and may be fixedly or removably attached to the frame. By way of example, and not limitation, sleep platforms 120 may be constructed by tautly attaching an adequately strong textile fabric material, or sleep slings, to the frame pipes forming the top square of the vertical column or, alternatively, formed by plastic molding to create a relatively flat surface for a cat to rest upon. Alternative embodiments of sleep platforms 120, include, for example, shallow wire baskets (optionally including a sleeping pad therein) and molded (e.g., preformed) plastic sleep pans that might be molded to include curved edges that mate with the top frame pipes and are held stably in place, for example, by the force of gravity. Those skilled in the art will readily recognize a multiplicity of known ways to implement sleep platforms 120. Similarly, removable embodiments of sleep platforms 120 may be removably attached to the frame by any known including, but not limited to, Velcro, snap fasteners, clamps, and the like. Some embodiments of sleep platforms 120 may also be non-removable depending on the needs of the particular application.

Typical components that may optionally be added include, but are not limited to, replaceable pillows, wire baskets (that may slide into basket area 125, for example), and floor mats. Other optional components include what is referred to as a fishing hole, which is a relatively short piece of open ended pipe, often less than six inches in length and one to two inches in diameter, that allows a cat to insert its paws to 'fish in'. A fish hole may (or may not) include a moveable object, which the cat can 'catch' but not totally remove from the hole. Similarly, what is referred to as a 'play hole' may be included, which is an open pipe, often four to six inch length and two inches in diameter, that a cat at one end can insert it's paw in to play with another cat inserting it's paw in the opposite end.

Yet other optional accessories include a preformed tube(s) (not shown), which can be used by a cat to sleep or play in or walk through, and could be made, for example, of a solid plastic tube, round or squared, typically sized at least twelve inches in diameter and up to twenty four inches in length, and is attached to frame pipes 105 or pipe joints 110. Preformed tray(s) (not shown) may also be suitably attached to frame pipes 105 or pipe joints 110 to hold water and food dishes, for example, off the floor. An optional component referred to as a cat grass holder(s) may also be attached to frame pipes 105 or pipe joints 110, which holder provides a water proof container for providing edible green treats for indoor cats.

Those skilled in the art will recognize that embodiments of the present invention may be readily adapted into a multiplicity of suitable size and design configurations depending on the needs of the particular application. For example, one implementation of the first embodiment may be forty inches long, twenty-one inches deep; with thirty-two inches high left end and twenty five inch high right end; thereby supporting two sleep platforms at different levels, one wire basket for toys and or a sleeping pad, one scratch rug or pad area, and one large litter box easily accommodating one to four cats.

Exemplary construction details will be set forth next. The frame of the first embodiment may be constructed out of any suitable material. One suitable framing material is one and a half inch diameter 40 PVC pipe or it may be constructed out any suitably sized material, which preferably provides lightweight strength, durability, design flexibility, and maximizes ease of sanitary upkeep by way of easily cleaned surfaces. PVC pipe also provides for easily replaceable, flexible, and cost effective frame construction components.

The PVC frame pipes and joints may be formed and joined together according to known techniques, including but not limited to gluing. For embodiments of sleep platforms 120 that include sleep slings, the top sleeping sling areas, however, are preferably glued according to a selective gluing process described below, thereby enabling the sleeping sling material to be easily replaced while being held securely together via the other attached frame pieces. This approach also enables the bottom of cat recreational house 100 to be filled (or emptied) with sand if extra ballast is needed, wherein the "bottom" refers to the rectangular frame bottom that sits on the floor. The piping and joints are preferably hollow and unobstructed to allow the filling of the 'bottom' framework, if desired or in a larger model, using the accessible uprights or via a threaded joint connection filled with sand, for example, to provide extra stability.

Basket area 125 is designed to receive any suitable basket. By way of example, and not limitation, a wire basket 16 inches long by 17 inches wide and 8 inches deep by be affixed in place by 4 clamps, which clamps may either be separate pieces or formed as part of the basket design. Alternative embodiments of basket area 125 may be designed such that a suitably configured basket may removably slide into basket area 125.

Scratch mats 115 are generally suitably sized and positioned according to the particular application; by way of example, and not limitation, scratch mats 115 is positioned lower or higher based on the size desired, which typically ranges in size from 14 inches by 18 inches to 18 inches by 28 inches, and may be attached by known means, including, for example, clamps inserted thru designated openings in the scratch rug.

For the foregoing implementation dimensions, sleep platforms 120 may be implement as sleep slings that are sized 16 inches wide by 21 inches long, and constructed out of heavy, durable material. Both slings may be supported at each corner; however, for the higher sleep sling a four sided support is preferred. Alternatively, a solid plastic sleep pans or shallow wire baskets attached by known means (including, for example, clamps) to the top of the vertical columns may replace the suspended sleep sling material. A removable sleep pad may be placed upon the solid sleeping surfaces.

The material forming the frame (e.g., PVC pipe) may be finished to any desired color and coordinated to the colors of the sleep platforms (e.g., sleeping slings or sleep pads), and the scratch rug or pad. Similarly, the litter box, which may be placed in a litter box area 135, and may be ornamented or graphically enhanced to be aesthetically pleasing and color coordinated to the other components of cat recreational house 100.

A selective gluing process suitable for attaching the sleep sling embodiments of sleep platforms 120 to cat recreational house 100 will now be described in some detail as follows. In a sleep sling embodiment of sleep platforms 120, the sleep slings have four notched corners (suitably notched to fit the top three-way corner pipe joints) tube edges is the sling for the high end. One frame pipe 105 (18 inches in length, for example) is inserted in protruding tubes on each side of the flat sling material, each side being tightly fitted together with a three-way pipe joint 110. This 'square' (e.g., made of four 18-inch pieces of PVC pipe joined by four 3-way joints) completes the top vertical column frame supporting the sling, which is then firmly seated on each of the four glued vertical frame pipes 105 thereby holding the top vertical column frame securely in place. The sleep slings (both high and low end) are seated by inserting in the open portion of the three-way joints and firmly pushing down or against to 'seat' it. Preferably, no piping or joints in the sleep sling frames are glued; however, all others are glued. In this way, the top frame may be readily disassembled for replacement of the sleeping sling by, for example, firmly hitting the underside of the pipe at each corner with the hand and lifting off the sling. Alternatively, instead of having protruding tubes on all sides of the sleep sling, some embodiments may only have these attachment tubes on two sides. In some applications, this alternative two-sided attachment of the sleep sling is more desirable for the lower height vertical column, where only three pipes (i.e., a 'U frame') are used to form top of the lower right vertical column 103 (the side joining to left vertical column 101 does not require a frame pipe 105). This U frame completes the frame for the lower sling. The 'open' end of the U is then firmly seated into the center openings of the 3-way T-joints and the bottom of 3-way T-joints are then firmly joined (e.g., seated and preferably not glued) onto the two central vertical frame pipes 105, thereby holds right vertical column 103 securely in place. Generally, for PVC implementations the outer vertical frame pipes 105 provide enough flexibility to accomplish the U frame placement without having to disassemble much of the frame. To remove the low right vertical column 103 for replacement of sling, the pipe underside on each outside corner may be firmly hit by hand to lift the T-joints apart gently pulling pipe ends out of the T-joints two sided sleeping sling U-frame is free.

Storage area 140 may be used for the storage of relatively small toys, accessories, or other desired items. Alternative embodiments of the present invention (not shown) may be the same as the foregoing embodiment(s), but further include solid door components mounted thereon for out-of-sight storage. For example, a pair of doors may be pivotally mounted, according to known attachment means, to frame pipes 105 such that they close to cover storage area 140. A multiplicity of known techniques exist to suitably provide the present invention operable doors to cover desired areas of the frame structure. By way of example, and not limitation, An alternative approach to providing doors is by way of a doored cabinet insert module, which may be slid into the section of cat recreational house 100 requiring doors; e.g.; storage area 140 in some applications. Such a cabinet insert module may be an enclosed, preformed solid plastic unit with a single or double door at a front opening, and might optionally include a shelf inside.

This module could be secured in any known way, including, for example, stops on the back of the module or moveable clips, or pins for quick easy removal and insertion. Embodiments including doors may provide quick, easy access to various sanitation items, replaceable air fresheners, treats, toy, related miscellaneous items, etc.

Those skilled in the art will appreciate that the number, placement, and size of any of the foregoing components (e.g., vertical columns, basket areas, litter box areas, play areas, sleep slings and related accessories such as baskets, preformed sleep platforms, cabinet modules, tubes, scratch and play areas, etc.) may be suitable varied according to the practical limits imposed by the size and design configuration of the particular cat recreational house implementation constructed according to the principles of the present invention. By way of example, and not limitation, for embodiments having a larger size, basket area 125 could be a play area that includes a place to hang or insert moveable toys, fishing and play holes, cat grass, preformed tubes, and/or a tray (possibly clipped on) for water and food.

Suitable attachment of any of the foregoing structural members or components may achieved according to known techniques including, but not limited to, clamps, bolts, screws, threaded joints, cable tie, preformed clamps, hanging hooks, and easy release snap type grip device.

A multiplicity of useful items may be removably or fixedly attached to embodiments of the present invention. For example, one such an attached item is a clip on lidded holder to hold litter scoop, larger sized design could also include an area with doors to store litter scoop and a container designed to store fecal matter. Yet another example is a clip on holder for cat grass or catnip.

Figure 2:
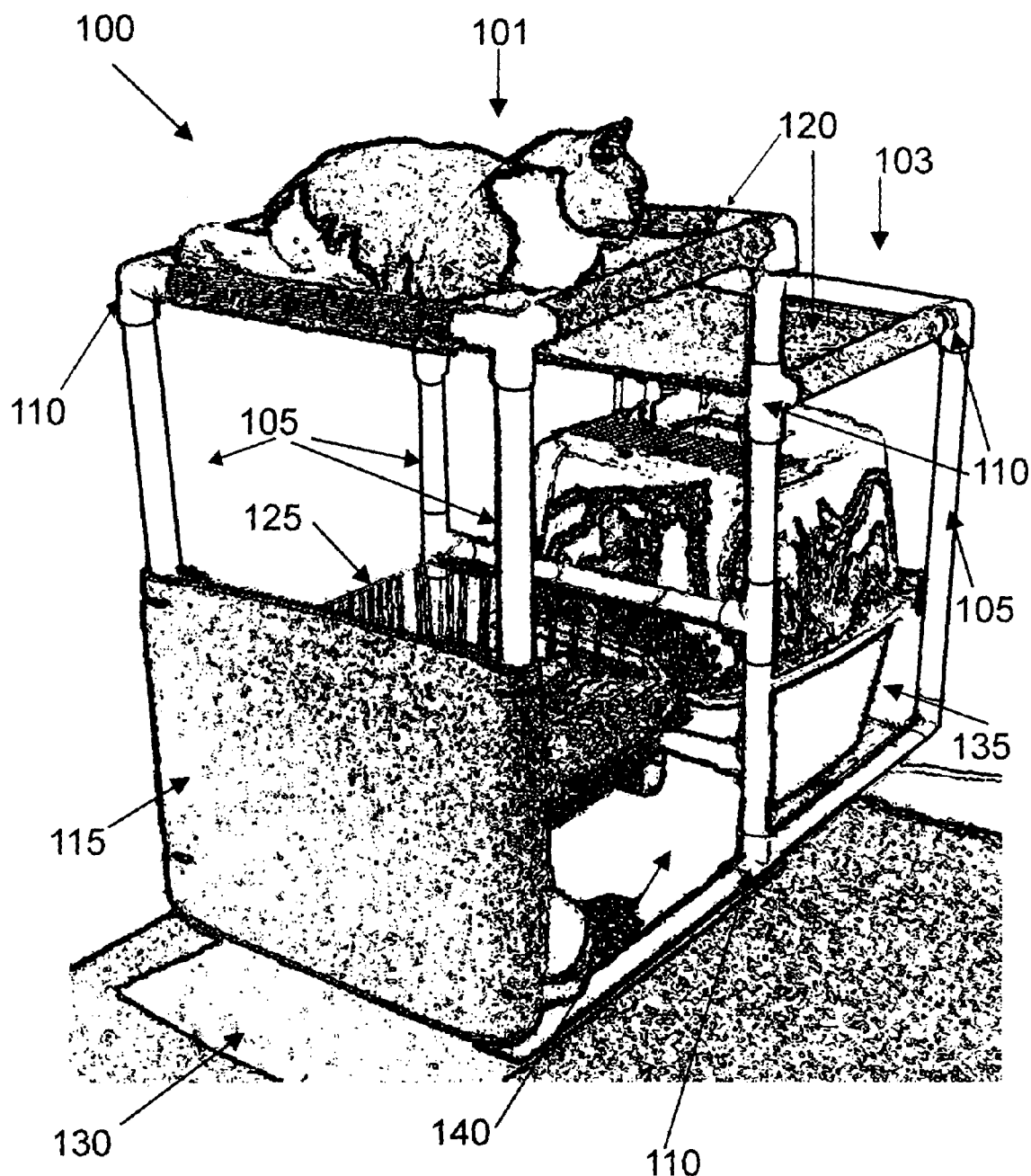
FIG. 2 illustrates a side perspective view of an exemplary PVC implementation of the first embodiment of the present invention.

Hence, a recreational cat house has been described that is preferably durable, lightweight, easy to keep clean and sanitary, and has a versatile construction approach that may include replaceable components, which may be marketed as an aesthetically pleasing "do-it-yourself product." Moreover, the replaceability of components (e.g., in PVC construction embodiments) enables the post-purchase adaptation by the consumer to coordinate color trends or preferences in home furnishings. FIG. 2 illustrates a front perspective view of an exemplary PVC embodiment of the present invention.

Having fully described at least one embodiment of the present invention, other equivalent or alternative methods of implementing recreational cat houses according to the present invention will be apparent to those skilled in the art. The invention has been described above by way of illustration, and the specific embodiments disclosed are not intended to limit the invention to the particular forms disclosed. For example, the particular implementation of the recreational cat house described in the foregoing were directed to a glued PVC pipe construction having two vertical columns; however, for example, other embodiments and techniques may augment, reconfigure, or remove structural elements, functional areas, or materials used (e.g., using similar plastic or metal based construction materials), or glued joints may be replaced by threaded joints (which would enable easy dismantling for storage or moving), where such alternative implementations of the present invention are contemplated as within the scope of the present invention. Moreover, although the foregoing embodiments were directed to implementations suitable for a cat, those skilled in the art will readily recognize how to adapt the foregoing teachings to accommodate other suitable animals. The invention is thus to cover all modifications, equivalents, and alternatives falling within the spirit and scope of the following claims.

What is claimed is:

1. A recreational pet apparatus comprising a framework formed of a plurality of pipes joined together by pipe joints, said frame having a first taller
    portion and a second shorter portion, said shorter portion being greater than one-half the height of said taller portion, which combined portions are comprised of left, center and right spaced front and rear pipe columns, the front and rear pipe columns including at their upper and lower termini first pipe joints, which first pipe joints are connected to lateral pipe members and pads designed to serve as sleeping platforms disposed upon the first and second portions,
    the elevation of the right front and right rear columns being less than the elevation of the center and left pipe columns, the center front and center rear pipe columns having a first intermediate pipe joint disposed in line in both the front and rear columns, at an elevation equal to the elevation of the right front and rear columns' first upper pipe joints, wherein the first pipe joints of the front and rear left and right columns are also connected to similar length transverse pipes and the intermediate pipe joints on the front and rear center columns are also connected by a lateral member, and further
    wherein the lateral pipes connecting the left and center columns at the top
    thereof are parallel to the lateral pipes connecting the bottoms thereof, and the transverse pipes connecting the first intermediate pipe joints of the center columns to the tops of
    the front and rear right columns are parallel to the transverse pipes at the bottom of the center and right columns,
    and additionally further wherein one of the pairs of parallel pipes at the bottom of each column are pre-filled with ballast prior to connection to their respective pipe joints to enhance the stability of the apparatus.

2. The apparatus of claim 1 further including a pad designed to serve as a sleeping platform disposed upon the quadrilateral formed by the junction of the left and center parallel lateral pipes and their pipe connectors with the upper front and upper rear transverse pipes.

3. The apparatus of claim 1 further including a pad designed to serve as a sleeping platform disposed upon the quadrilateral formed by the junction of the center intermediate lateral pipe and the right upper lateral pipe and their pipe connectors with their front and rear transverse pipes.

4. The apparatus of claim 1 further including a pad designed to serve as a scratch pad disposed between one of (a) the left front and rear columns, and (b) the right front and rear columns.

5. The apparatus of claim 1 wherein the apparatus includes one scratch pad vertically disposed.

6. The device of claim 1 further including a wire basket disposed upon the left and center lateral pipes for the storage of cat associated items.

7. The apparatus of claim 1 wherein the distance between the upper and lower pipes connecting the right and center columns is adequate to permit storage of a litter box for comfortable use by a cat.

* * * * *